US006762692B1

(12) United States Patent
Mingot et al.

(10) Patent No.: US 6,762,692 B1
(45) Date of Patent: Jul. 13, 2004

(54) SYSTEM COMPRISING A REMOTE CONTROLLED APPARATUS AND VOICE-OPERATED REMOTE CONTROL DEVICE FOR THE APPARATUS

(75) Inventors: Jacques Mingot, Noisy le Roi (FR); Jiang Shao, Rennes (FR); Eric Diehl, Liffré (FR); Nour-Eddine Tazine, Noyal sur Vilaine (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/786,660
(22) PCT Filed: Sep. 21, 1999
(86) PCT No.: PCT/FR99/02239
  § 371 (c)(1),
  (2), (4) Date: Mar. 7, 2001
(87) PCT Pub. No.: WO00/17857
  PCT Pub. Date: Mar. 30, 2000

(30) Foreign Application Priority Data

Sep. 21, 1998 (FR) .......................................... 98 11838

(51) Int. Cl.⁷ ............................................. G08C 19/00
(52) U.S. Cl. .................. 340/825.69; 704/251; 348/735; 340/825.72
(58) Field of Search ................................ 704/275, 251; 273/2, 84; 348/735, 14.05, 14.07, 687, 734, 769; 340/825.69, 825.72, 825.24, 825.25; 345/705, 714, 716, 728; 398/106; 367/97

(56) References Cited

U.S. PATENT DOCUMENTS 5,386,494 A   1/1995   White ........................ 395/2.84
5,774,859 A   6/1998   Houser et al. .............. 704/275

FOREIGN PATENT DOCUMENTS

WO   95/06938   3/1995   .............. G01L/9/00

OTHER PUBLICATIONS

Copy of International Search Report.

Primary Examiner—Brian Zimmerman
Assistant Examiner—Matsuichiro Shimizu
(74) Attorney, Agent, or Firm—Joseph S. Tripoli; Kuniyuki Akiyama

(57) ABSTRACT

The system includes a remote controlled apparatus furnished with a display device or adapted to be linked to such a device; a remote control device comprising a microphone; voice recognition circuit adapted to receive the signal emanating from the microphone and to generate a signal for controlling a functional feature of the apparatus corresponding to the word or group of words picked up by the microphone. The system comprises means for displaying on the said screen a list of the words or groups of words corresponding to the functional features of the apparatus which can be accessed by voice control in a window of the screen so as to enable the user to ascertain the key words which he has to utter in order to trigger these functional features.

10 Claims, 4 Drawing Sheets

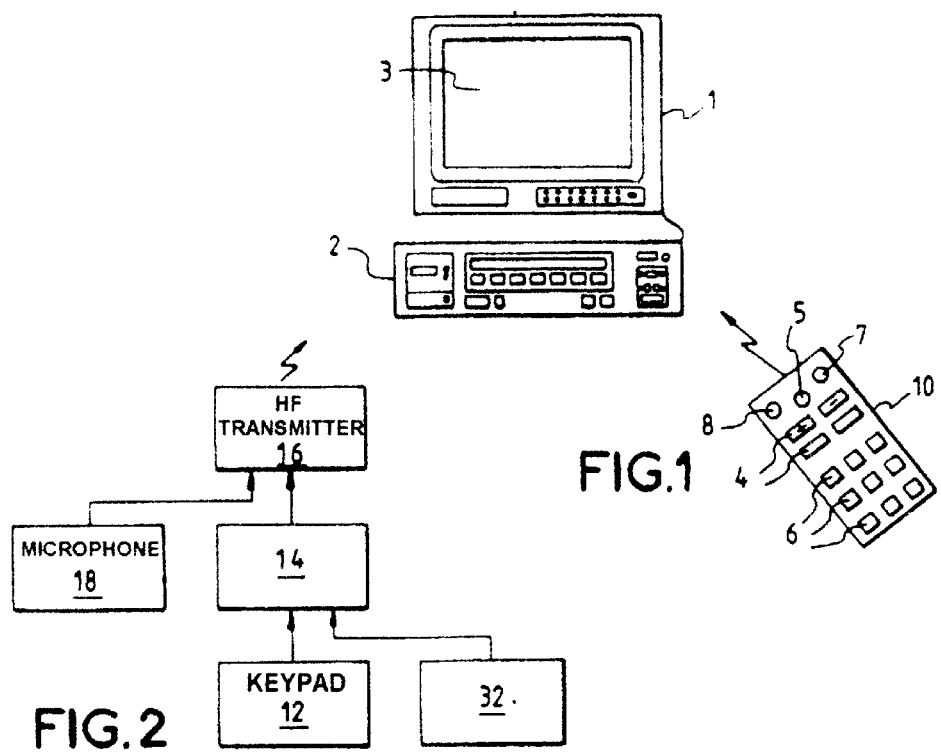
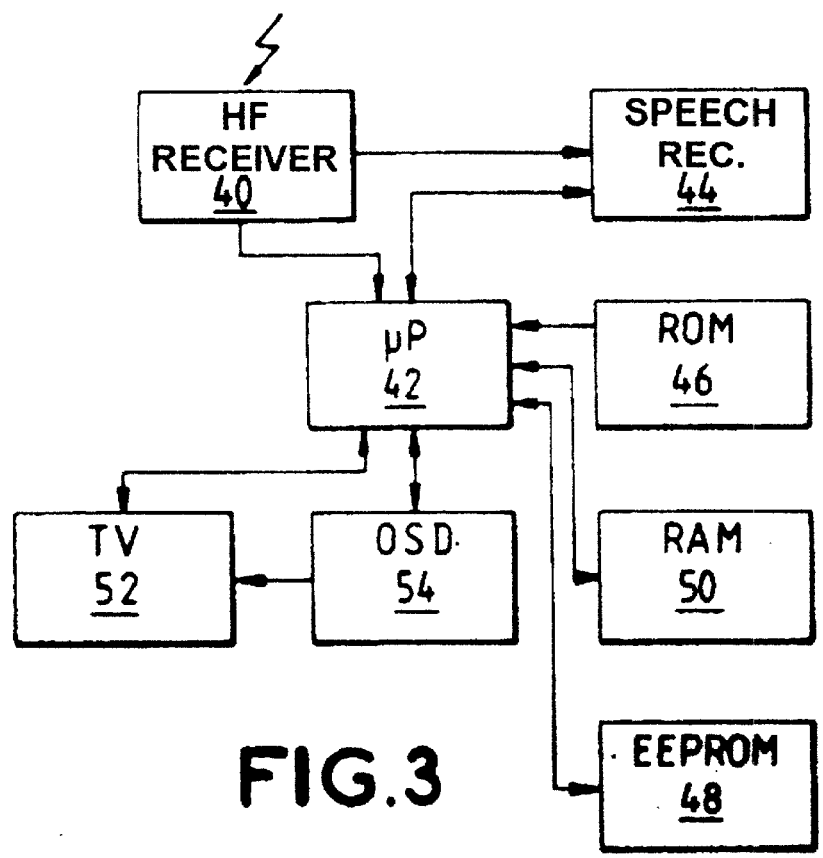

```
AVAILABLE
VOICE
COMMANDS
CLOSE HELP
SUMMARY

PROGRAMME GUIDE
LIST OF STATIONS
  STATION 1
  STATION 2
  - - -
  STATION N
PICTURE
  BRIGHTNESS
  CONTRAST
  COLOUR
SOUND
  BASS
  TREBLE
  PERSPECTIVE
  EXPANDED SOUND
  NORMAL SOUND
  VOLUME
  MUTE
WAKE-UP
ZOOM
  4/3
  16/9
  ZOOM 1
```
— 65

FIG.5

```
AVAILABLE
VOICE
COMMANDS
CLOSE HELP
EXIT
SUMMARY

STATION
  ALL STATIONS
  STATION 1
  STATION 2
  - - -
  STATION N
TOPIC
  ALL TOPICS
  FILM
  INFORMATION
  VARIETY
  SPORT
  YOUTH
  MUSIC
DAY
  MONDAY
  TUESDAY
  - - -
  SUNDAY
PERIOD
  MORNING
  AFTERNOON
  EVENING
  NIGHT
RÉSUMÉ
RECORD
VIEW
PICTURE
  BRIGHTNESS
  CONTRAST
  COLOUR
SOUND
  BASS
  TREBLE
  PERSPECTIVE
  EXPANDED SOUND
  NORMAL SOUND
  VOLUME
  MUTE
ZOOM
  4/3
  16/9
  ZOOM 1
```
75 —

FIG.6

SYSTEM COMPRISING A REMOTE CONTROLLED APPARATUS AND VOICE-OPERATED REMOTE CONTROL DEVICE FOR THE APPARATUS

This application claims the benefit under 35 U.S.C. § 365 of International Application PCT/FR99/02239, filed Sep. 21, 1999, which was published in accordance with PCT Article 21(2) on Mar. 30, 2000 in French, and which claims the benefit of French Patent Application No. 9811838, filed Sep. 21, 1998.

The present invention relates to a system comprising a remote controlled apparatus and an associated remote control device.

It relates more particularly to such a system in which the remote controlled apparatus is furnished with a display device or is adapted to be used by being linked to such a device, for example a television receiver, a video recorder or a decoder of the video signal received from a satellite or via cable.

Remote controls are increasingly being used to remotely control the functional features of apparatuses of this type. In general they comprise a number of buttons coupled to circuits which make it possible to transmit control signals, generally sent in coded form by infrared carrier, to the remote controlled apparatus. In what follows, the invention will be set forth while referring only to a television receiver, for the sake of simplification, but the invention applies more generally to any type of remote controlled apparatus comprising, or linked to, a display device.

The use of a remote control device is sometimes felt to be complex by the user, for example in the case where his television can receive several tens of different stations, he does not always remember the number associated with each of the stations which he can watch. Likewise, the controls of the television (picture, sound, etc.) as well as certain functional features (programme guide, wake-up function, etc.) are often accessible via a menu and submenus which oblige the user to perform several successive operations.

This is why voice-based remote control devices have already been proposed, in which a microphone and a voice recognition circuit, which may be disposed in the remote control or, more advantageously, in the remote controlled apparatus, are provided. The user can thus access the various functional features of the apparatus simply by uttering key words corresponding to the said functional features.

The problem is that very often the user no longer exactly remembers words which he has to utter in order to control certain functional features, in particular when he does not use them frequently. In this case, he still prefers to use the buttons of the remote control and the benefit of providing a voice-based remote control is therefore limited.

An object of the present invention is to solve this problem.

Accordingly, the invention proposes a system comprising: a remote controlled apparatus furnished with a display device or adapted to be linked to such a device; a remote control device comprising a microphone; voice recognition means adapted to receive the signal emanating from the microphone and to generate a signal for controlling a functional feature of the apparatus corresponding to the word or group of words picked up by the microphone, in which the functional features of the apparatus are accessible by the remote control device through a tree of menus adapted to be displayed on a screen of the said display device. According to the invention, the system comprises means for displaying a list of the words or groups of words corresponding to the functional features of the apparatus which can be accessed by voice control, the said list being adapted to be displayed independently of the display of the menus.

By virtue of this list, the user knows immediately what functional features are accessible by voice commands and, above all, he sees the key words which he has to utter in order to access these functional features. Thus, he no longer has any hesitation and can profit fully from all the possibilities offered by voice-based remote control.

According to an aspect of the invention, the list of functional features which can be accessed by voice control is different depending on what context the apparatus is in.

According to a particular embodiment, the list of functional features which can be accessed by voice control is specific to each menu or submenu.

In this particular embodiment, functional features of the apparatus can be accessed by voice control by short-circuiting branches of the tree of menus.

According to another aspect of the invention, the display means are adapted to display the list of functional features which can be accessed by voice control in a window of the screen, the words or groups of words corresponding to the said functional features scrolling through the said window. In this case, voice controls are provided for stopping and for triggering the scrolling of the list through the window (31).

According to a particular embodiment, the remote control device comprises a switch which can be actuated by the user so as to authorize the transmission, by a transmitter, of signals originating from the microphone, the displaying of the list of functional features which can be accessed by voice control being proposed to the user when the said switch is actuated.

The invention also relates to a remote controlled apparatus furnished with a display device or adapted to be linked to such a device and comprising voice recognition means adapted to receive a signal emanating from a microphone and to generate a signal for controlling a functional feature of the apparatus corresponding to the word or group of words picked up by the microphone, the said functional features of the apparatus being accessible via a tree of menus adapted to be displayed on a screen of the said display device, characterized in that it comprises means for displaying a list of the words or groups of words corresponding to the functional features of the apparatus which can be accessed by voice control, the said list being adapted to be displayed independently of the display of the menus.

Other characteristics and advantages of the invention will become apparent via the following description of a particular embodiment, which is non limiting, of the invention given with reference to the appended figures, in which:

FIG. 1 represents a system according to the invention,

FIG. 2 is a diagram in block form of the circuits of a remote control device belonging to a system according to the invention;

FIG. 3 is a diagram, likewise in block form, of circuits equipping a television belonging to a system according to the invention;

Figure 7:
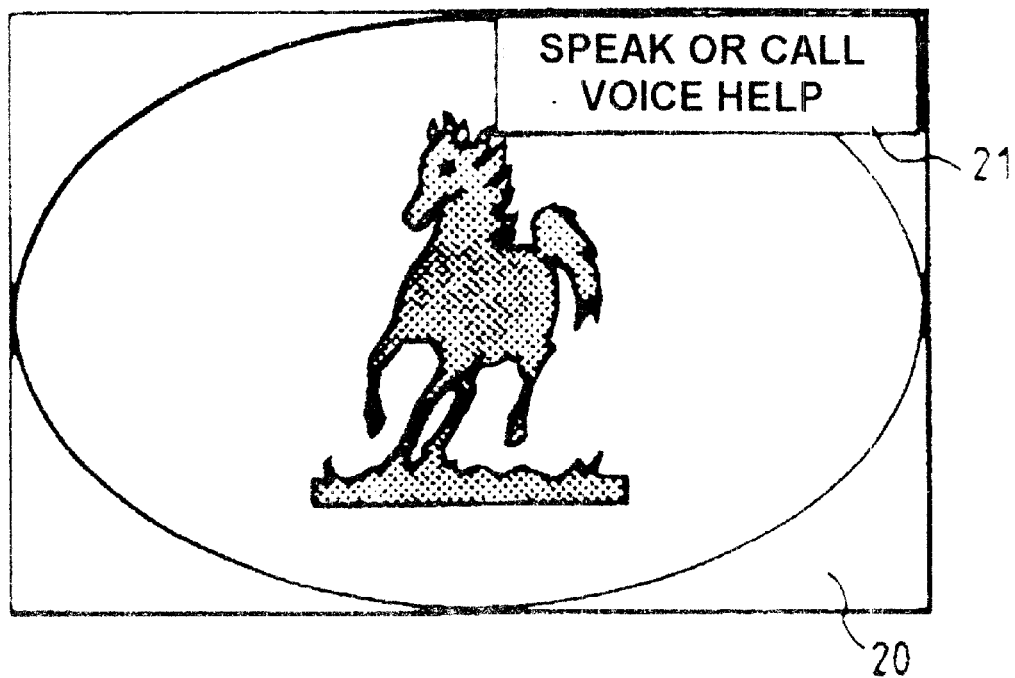
Figure 8:
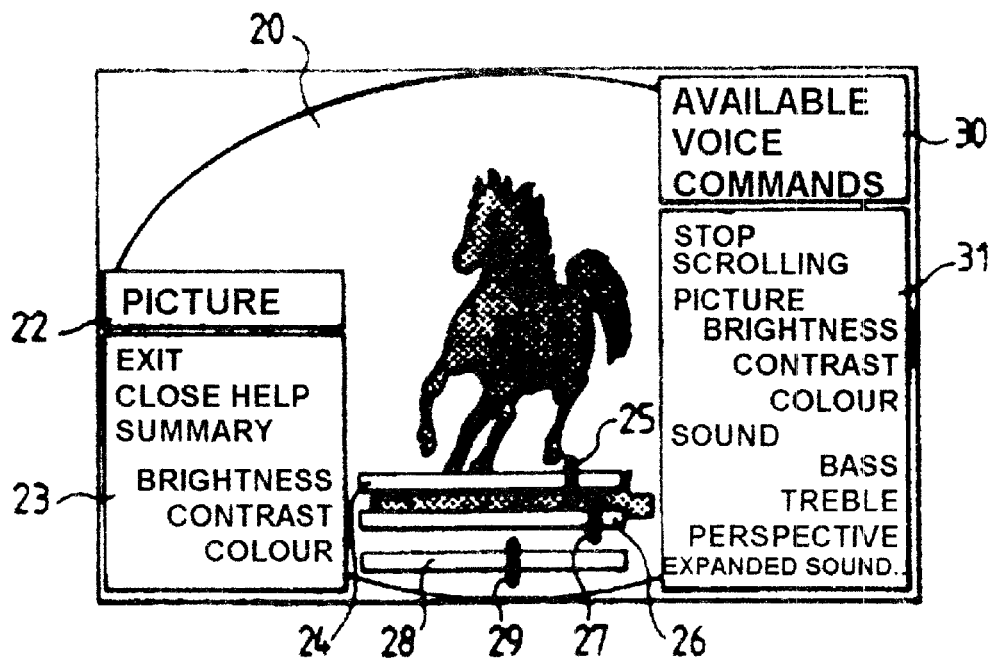

FIGS. 5 and represent the content of the voice help window in two different implementational contexts of the invention;

FIGS. 7 and 8 represent the content of the screen of the television at two different implementational instants of the invention.

Represented in FIG. 1 is a television 1 to which is linked a video recorder 2. These two apparatuses can be controlled remotely with the help of the remote control device 10. In the subsequent description, more particular interest will be focussed on the control of the television 1.

The remote control device 10, which is also represented diagrammatically in FIG. 2, comprises in a conventional manner a keypad 12 furnished with buttons 6, corresponding for example to digits, and 4, for example "plus" and "minus" buttons for adjusting in particular the volume of the sound of the television 1. A coding circuit 14 codes the signals corresponding to the actuation of the buttons before sending them to a transmitter 16 of high-frequency signals (HF) making it possible to despatch the control signals to the television 1.

The device also comprises a microphone 18 equipped with a circuit (not shown) for shaping the signals and connected to the transmitter 16. Furthermore, a button 5 is provided on the remote control device for actuating a switch 32 which authorizes the sending, by the transmitter 16, of the signals originating from the microphone 18 to the television, only when the user presses the said button. The aim of this is to limit the consumption of energy by the transmitter when the user is not dispatching any voice command.

The television 1 comprises a screen 3 which makes it possible to display the video image corresponding to a signal emanating from the tuner of the television or originating from the video recorder 2. The screen 3 also makes it possible to display a menu for controlling and adjusting the television. It furthermore makes it possible, according to the invention, to display the list of words or expressions which may be uttered by the user so as to access the various functional features of the television by voice command. This list is displayed in a window which will subsequently be referred to as the voice help window and which is independent of the windows for displaying the menus.

FIG. 3 represents the elements of the television making it possible to exploit the signals originating from the remote control device 10.

A high-frequency (HF) receiver 40 receives the signals provided by the transmitter 16. It delivers them, on the one hand to a microprocessor 42, and on the other hand to a speech recognition circuit 44. The signals provided by the keypad 12 are processed directly by the microprocessor 42 whilst the signals provided by the microphone 18 are processed by the speech recognition circuit 44.

The microprocessor 42 is associated with a read only memory (ROM) 46 containing the programs which are to be executed by the microprocessor. A programmable read only memory (EEPROM) 48 makes it possible to store persistent data such as, for example, the channel allocation table. A random access memory (RAM) 50 also communicates with the microprocessor 42 so as to store non-persistent data, that is to say volatile data.

The links from the random access memory 50 and programmable memory 48 to the microprocessor 42 are of the bidirectional type. Likewise, the speech recognition circuit 44 is connected by a bidirectional link to the microprocessor 42.

The microprocessor 42 controls, on the one hand, the various functional features of the television, such as the volume, the change of station, the brightness and the contrast, etc. and, on the other hand, a circuit 54 for displaying data on the screen, often referred to as an OSD circuit standing for "On Screen Display". The OSD circuit 54 is a text and graphics generator which makes it possible to display, on the screen, menus, pictograms (for example, a number corresponding to the station being viewed) and which makes it possible to display the voice help window of the invention.

When the user transmits a voice command by uttering a word corresponding to a particular functional feature of the television, the voice control, sent by the transmitter 16 to the receiver 40, is processed by the voice recognition circuit 44 so as to be converted into a signal which can be interpreted by the microprocessor 42 so that the latter may transform it into a command which can be executed by the circuits 52 of the television.

Thus, a large number of functional features of the television are accessible by virtue of voice command in a manner which is often simpler and faster than when they are controlled from the buttons of the remote control device.

Figure 4:
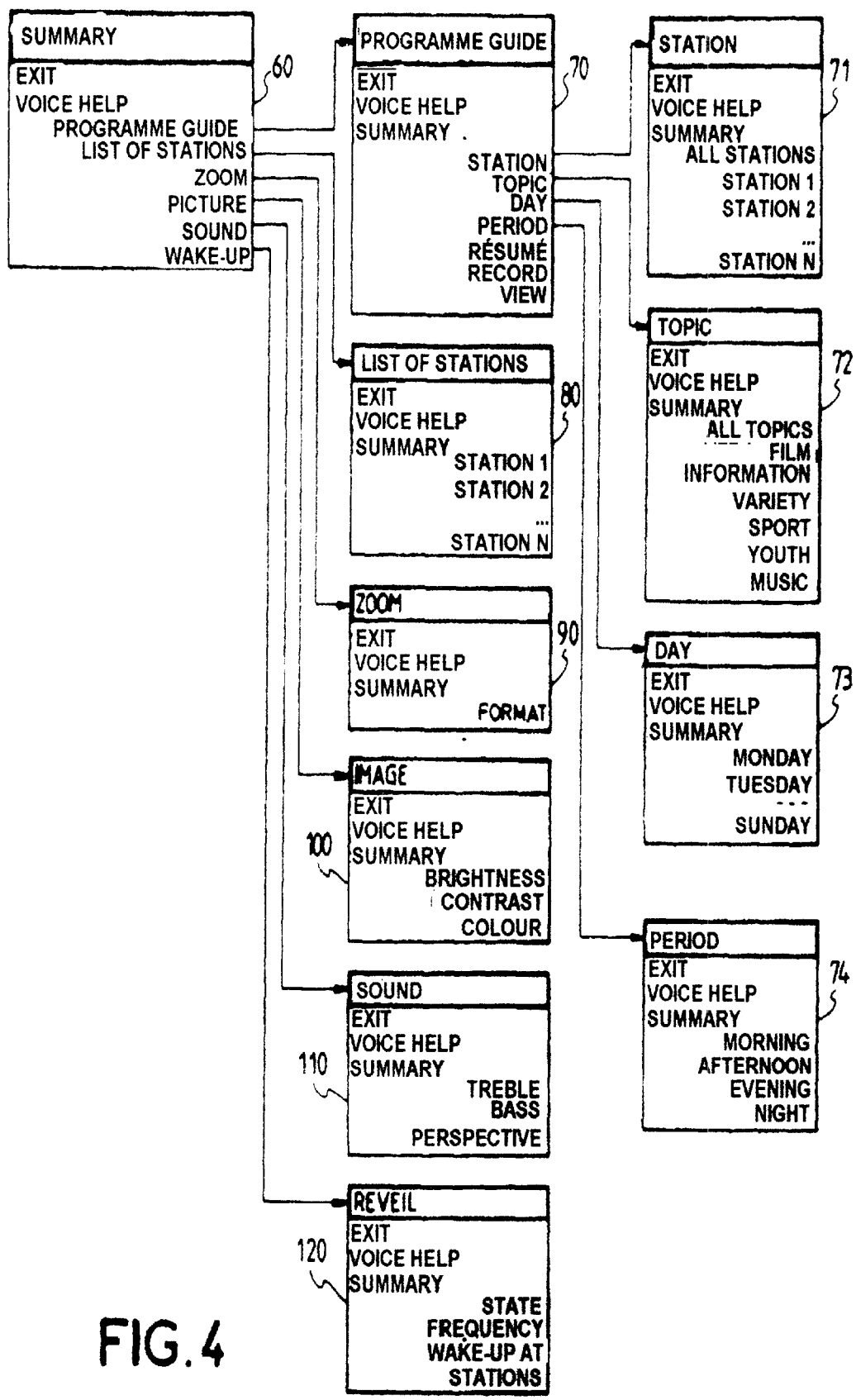
FIG. 4 illustrates the tree of menus making it possible to access the various functional features of a television belonging to a system according to the invention.

Represented in FIG. 4 is the tree of menus making it possible to access the various functional features of the television. The window 60 represent the main menu or summary which is displayed on the screen of the television, either when the user depresses a particular button 8 (FIG. 1) of the remote control device, or when he utters the word "summary" or "menu" in front of the microphone of the remote control device.

The menu tree presented in FIG. 4 is given by way of example but it would be entirely conceivable to apply the invention to menus comprising other functional features.

The main menu 60 proposes access to six functional features, which appear in the form of menus 70, 80, 90, 100, 110, and 120: a programme guide 70, the list of available stations 80, a "Zoom" function 90 making it possible to modify the display format, the adjusting of certain parameters of the picture 100 and of the sound 110 and finally, a "wake-up" function 120 allowing advance programming of the switching on of the television.

Certain menus, in this instance the "Programme guide" menu 70, afford access to submenus allowing certain functional features to be itemized in greater detail. In the example of FIG. 4, the menu 70 makes it possible to access the following headings: "Station" 71, "Topic" 72, "Day" 73 and "Period" 74, allowing selection respectively of the station, the topic, the day and the period during the day, which are those for which the user wishes to ascertain the programmes.

At the outset, when the user calls up the main menu, as was seen hereinabove, the window 60 is displayed on the screen, overprinted on the current video image. To access the various headings of the tree, the user can either proceed in a conventional manner by moving around within the window 60 with the help of particular "Up", "Down" buttons and by selecting a particular line with the help of a button 7 (FIG. 1) of the remote control device, or use the voice control by uttering one of the key words corresponding to the title of the proposed headings. For example, by uttering the word "zoom", the user causes the window 90 of the "Zoom" menu to be displayed on the screen, thereby making it possible to modify the picture display format on the screen of the television by choosing from the 4/3 format, the 16/9 format or else some other display format.

The user proceeds in the same way so as to select the functional features in the menus or submenus of the tree.

Three identical commands are found in each menu or submenu of the tree: "Exit", "Voice help" and "Summary". The "Exit" command makes it possible to exit the menu so as to return to the conventional televised programmes; the "Summary" command makes it possible to return to the main menu. Naturally this "Summary" command is not proposed in the main menu. The "Voice help" command makes it possible, according to the invention, to display a voice help window containing all the key words corresponding to the functional features which can be accessed by voice control, this window being displayed independently of the windows of the menus described previously.

In a preferred embodiment, the content of the voice help window, that is to say the list of key words, is different depending on the context prevailing, that is to say depending on whether the television is in conventional televised mode or whether a particular menu is selected.

Thus, represented in FIG. 5 is the content of the voice help window such as it appears when the television is in conventional televised mode, that is to say when a video programme, received for example from the tuner of the television or a video recorder, is displayed on the screen. It is possible, by uttering the appropriate words or groups of words from those present in the list 65 of FIG. 5, to access the "Programme guide" menu 70, the "Station list" menu 80, the "Picture" menu 100, the "Sound" menu 110, etc.

According to a particularly advantageous embodiment of the invention, the voice control makes it possible to access certain functional features directly without going via successive steps as in the case where the buttons of the remote control device are used. In this case, one will speak of "voice shortcuts". For example, to change the picture display format on the screen and switch to a 16/9 display format (when the current format is 4/3 for example), it is sufficient for the user to utter the words "sixteen ninth" in front of the mike of the remote control device so that the corresponding command is sent to the circuits 52 (FIG. 3) of the television and so that the display format is modified accordingly. If the user wished to achieve the same result using the buttons of the remote control device, he would firstly have to press the button 8 (FIG. 1) making it possible to display the main menu 60 (FIG. 4) on the screen; he would then have to move around with the help of the "Up" and "Down" buttons so as to reach the "Zoom" line of the main menu, select this line by pressing the button 7, thereby causing the "Zoom" menu to be displayed, and finally choose the 16/9 format with the help of move and select buttons of the remote control device. The displaying of the voice help window is particularly advantageous in this case since the user is not necessarily aware of all the functional features which he can access by voice shortcut from a given context.

According to another particularly advantageous aspect of the invention, it is possible to use synonyms of the words or groups of words cited in the list of the voice help window to select the corresponding functional features. Thus, in the case of the previous example, the user will be able to utter, instead of the words "sixteen ninth" the words "sixteen nine" or "sixteen over nine". For this purpose, it is sufficient to programme the speech recognition circuit 44 so as to teach it to recognize the synonyms of the various key words making it possible to access the functional features of the television.

Represented in FIG. 6 is the content of the voice help window in another context, when the "Programme guide" menu is activated. It may be observed that a number of new functional features are accessible in the list 75: all those allowing access to the submenus 71 to 74 of the "Programme guide" menu. Moreover, functional features which were present in the list 65 of FIG. 5 are also accessible by voice control in the context of the "Programme guide" menu, for example the functional features relating to the adjustment of the picture, the sound or the format of the picture ("Zoom"). This makes it possible in a very advantageous manner to access another menu very rapidly when one is in a given menu without needing to go back via the main menu as would be necessary if the user were using the buttons of the remote control device.

It is interesting to note that one and the same word or group of words can control a different functional feature depending on the context in which it is uttered. For example, in FIG. 5, it may be seen that in the list 65 of functional features which can be accessed by voice control, one finds the words "Station 1", "Station 2", etc., "Station N", which words are also found in the list 75 of FIG. 6. In the context of FIG. 5, that is to say in conventional televised mode, when the user utters "station two", the television displays on the screen the programme of station number 2. On the other hand, in the context of FIG. 6, that is to say in "Programme guide" mode, the uttering of the words "station two" by the user simply indicates that he wishes to ascertain the programmes of station number 2 and bring about the displaying on the screen of the programmes of station number 2 as a function of the other parameters (topics, day, etc.) which have been chosen.

With reference to FIGS. 7 and 8 which represent the content of the screen of the television at two different instants, an explanation will now be given of how the invention is implemented at the level of the displaying on the screen of the television.

In FIGS. 7 and 8, a picture 20 corresponding to a televised programme is displayed on the screen of the television. When the user presses the button 5 (FIG. 1) of the remote control device and indicates by this action his intention to use the voice command, a message appears in a window 21 on the screen of the television prompting the user either to speak if he already knows the key words serving to control the functional features of the television, or to call up the voice help to obtain the list of the said key words.

In FIG. 8 it is assumed that the user has firstly selected the "Picture" menu, either by uttering the word "picture", or with the help of the appropriate buttons of the remote control device, thus causing the displaying of the windows 22 and 23 of the "Picture" menu, overprinted on the video image 20, in the left part of the screen. In this menu, it is possible to adjust the brightness, the contrast and the colour of the picture by using "plus" and "minus" buttons of the remote control device or by uttering the words "plus" and "minus", thus causing the sliders 25, 27 and 29 to move along scales 24, 26 and 28. The sliders and the scales are graphics displayed on the screen so that the user may visually flag his adjustment.

It is furthermore assumed that the user has requested the displaying of the voice help window so as to ascertain the functional features which can be accessed within the prevailing context, that is to say in the "Picture" menu. A voice help window 30, 31 is therefore displayed on the right part of the screen. Since the entire list of accessible functional features cannot be displayed at the same time in the window, this list scrolls through the window 31 in a loop as long as the user does not utter the words "stop scrolling" in which case, the window is frozen in the state which prevailed at that moment. When the window is in a frozen state, the words "Stop scrolling" of the list are replaced by "Scrolling of pages" which correspond to the words which the user must utter for scrolling to resume.

As soon as the user utters one of the key words appearing in the list which scrolls through the window 31, the said window is closed forthwith and the corresponding functional feature effected.

In the window 23, one of the headings is different from those which appear in FIG. 4 in the menu 100. Specifically, the "Voice help" heading, which is present when the voice help window is not displayed so as to prompt the user to view it, is replaced with the "Close help" heading when the voice help window is being displayed as is the case in FIG. 8, so as this time to prompt the user to close the said window.

What is claimed is:

1. System comprising:
   a remote controlled apparatus furnished with a display device or adapted to be linked to such a device;
   a remote control device comprising a microphone;
   voice recognition means adapted to receive the signal emanating from the microphone and to generate a signal for controlling a functional feature of the apparatus corresponding to the word or group of words picked up by the microphone,
   in which the functional features of the apparatus are accessible by the remote control device through a tree of menus adapted to be displayed on a screen of the said display device,
   wherein it comprises means for displaying on the said screen a list of the words or groups of words corresponding to the functional features of the apparatus which can be accessed by voice control, the said list being adapted to be displayed independently of the display of the menus.

2. System according to claim 1, wherein the list of functional features which can be accessed by voice control is different depending on what context the apparatus is in.

3. System according to claim 1, wherein the list of functional features which can be accessed by voice control is specific to each menu or submenu.

4. System according to claim 3, wherein functional features of the apparatus can be accessed by voice control by traversing several branches of the tree of menus simultaneously.

5. System according to claim 1, wherein the display means are adapted to display the list of functional features which can be accessed by voice control in a window of the screen, the words or groups of words corresponding to the said functional features scrolling through the said window.

6. System according to claim 5, wherein voice controls are provided for stopping and for triggering the scrolling of the list through the window.

7. System according to claim 1, wherein a functional feature of the apparatus can be accessed by voice control by a word or group of words cited in the list and as appropriate by at least one synonym of this word or group of words.

8. System according to claim 1, in which the remote control device comprises a switch which can be actuated by the user so as to authorize the transmission, by a transmitter, of signals originating from the microphone, wherein the displaying of the list of functional features which can be accessed by voice control is proposed to the user when the said switch is actuated.

9. System according to claim 1, wherein the remote controlled apparatus comprises an apparatus from the group consisting of a television receiver, a video recorder and a decoder of the video signal received from a satellite or via cable.

10. Remote controlled apparatus furnished with a display device or adapted to be linked to such a device and comprising voice recognition means adapted to receive a signal emanating from a microphone and to generate a signal for controlling a functional feature of the apparatus corresponding to the word or group of words picked up by the microphone,
   wherein it comprises means (54) for displaying on the said screen a list of the words or groups of words corresponding to the functional features of the apparatus which can be accessed by voice control, the said list being adapted to be displayed independently of the display of the menus, the said functional features of the apparatus can be accessed by the remote control device via a tree of menus adapted to be displayed on a screen of the said display device.

* * * * *